United States Patent [19]

Kishimoto et al.

[11] Patent Number: 5,134,390
[45] Date of Patent: Jul. 28, 1992

[54] METHOD AND APPARATUS FOR ROTATABLE DISPLAY

[75] Inventors: Kazutomo Kishimoto; Masahiro Okumura, both of Odawara; Tamon Masimo; Tatsuya Sakamoto, both of Hiratsuka; Youji Kouno, Odawara, all of Japan

[73] Assignee: Hitachi, Ltd., Tokyo, Japan

[21] Appl. No.: 381,306

[22] Filed: Jul. 18, 1989

[30] Foreign Application Priority Data

Jul. 21, 1988 [JP] Japan .................. 63-182128

[51] Int. Cl.⁵ .............................. G09G 1/06
[52] U.S. Cl. ........................ 340/727; 358/254; 248/917
[58] Field of Search .......... 340/727, 724; 248/923, 248/919, 918, 917–923; 74/204; 358/150, 249, 254, 194; 315/8, 85; 318/466

[56] References Cited

U.S. PATENT DOCUMENTS

| | | | |
|---|---|---|---|
| 4,183,254 | 1/1980 | Good | 74/206 |
| 4,191,915 | 3/1980 | Johansson | 318/466 |
| 4,267,555 | 5/1981 | Boyd et al. | |
| 4,408,146 | 10/1983 | Beckerman | 318/466 |
| 4,453,689 | 6/1984 | Ellis et al. | 248/923 |
| 4,535,270 | 8/1985 | Frantz et al. | 315/8 |
| 4,542,377 | 9/1985 | Hagen et al. | |
| 4,616,218 | 10/1986 | Barley et al. | 248/920 |
| 4,739,403 | 4/1988 | Mark | 358/150 |
| 4,772,881 | 9/1988 | Hannah | 340/703 |
| 4,831,368 | 3/1989 | Masimo et al. | 340/724 |
| 4,899,082 | 2/1990 | Sands et al. | 315/8 |
| 4,950,955 | 8/1990 | Hoover et al. | 315/8 |
| 4,952,920 | 8/1990 | Hayashi | 340/727 |

FOREIGN PATENT DOCUMENTS

WO85/01648 4/1985 PCT Int'l Appl. .

OTHER PUBLICATIONS

P. R. Herrold et al., "Alphanumeric CRT Display Having a Plurality of Display Positions", IBM Technical Disclosure Bulletin, vol. 22, No. 4, 9/79, p. 1338.

Chris Balley, "Work Station Sports Full-Page Screen with Graphics", Peripherals, Electronic Design, 5/82, p. 239.

Primary Examiner—Alvin E. Oberley
Assistant Examiner—Doon Yue Chow
Attorney, Agent, or Firm—Fay, Sharpe, Beall, Fagan, Minnich & McKee

[57] ABSTRACT

In a filing system having a storage device for storing image information and a display with a rectangular screen for visually displaying the stored image information, the screen is arranged to be positioned at an upright position or at a lateral position, with a motor. The switch between two positions of the screen is effected upon instruction input from a keyboard, or in accordance with the information representative of the screen position which is stored beforehand in the storage device for each of the image information. The screen is also provided with a tilting mechanism which is released while the screen rotates. There is compensate circuit compensating for a positional displacement of a displayed image caused by a difference of earth magnetism between two positions of the screen.

20 Claims, 10 Drawing Sheets

F I G. 1
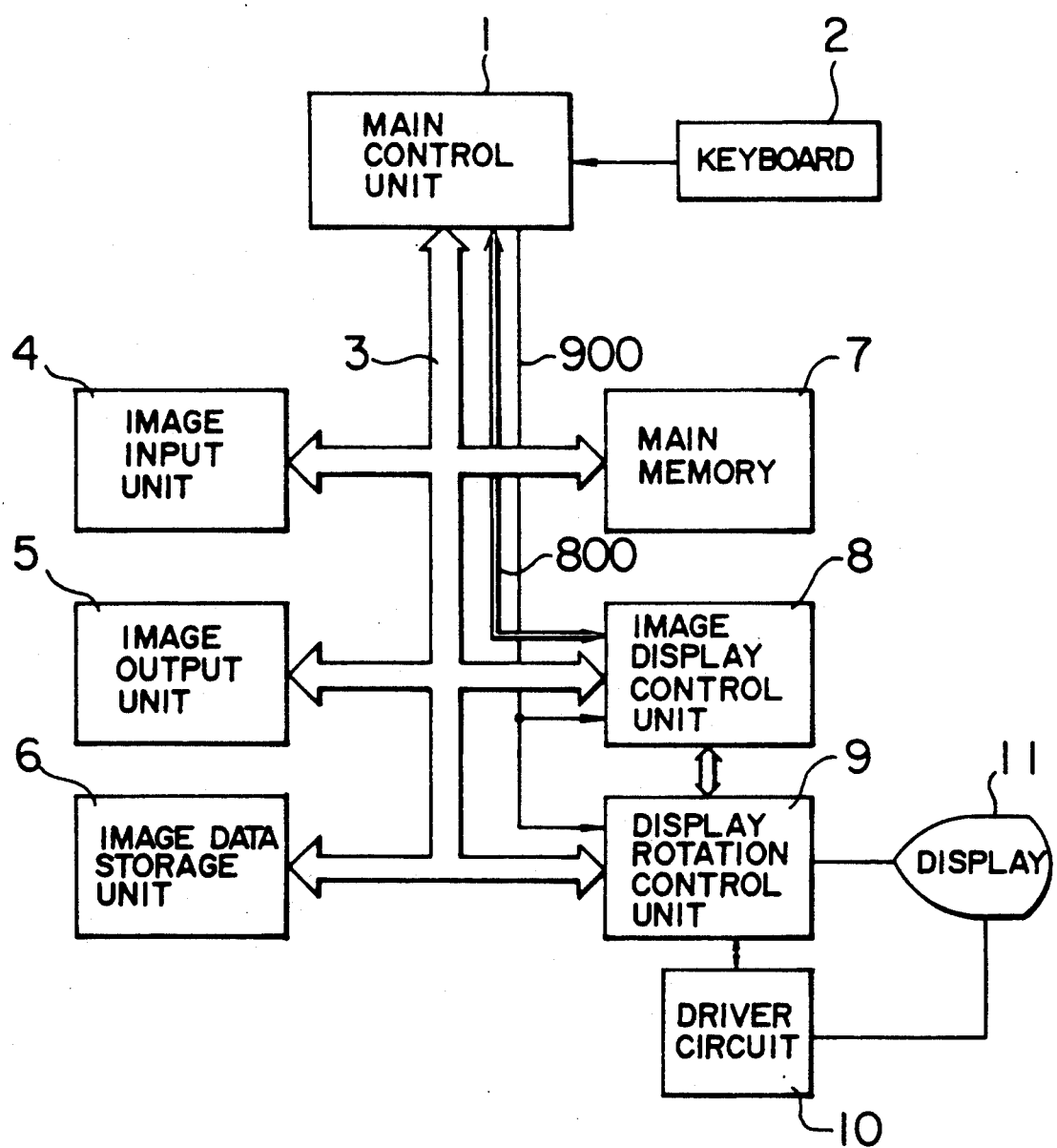

Ra ≈ Rb

FIG. 8
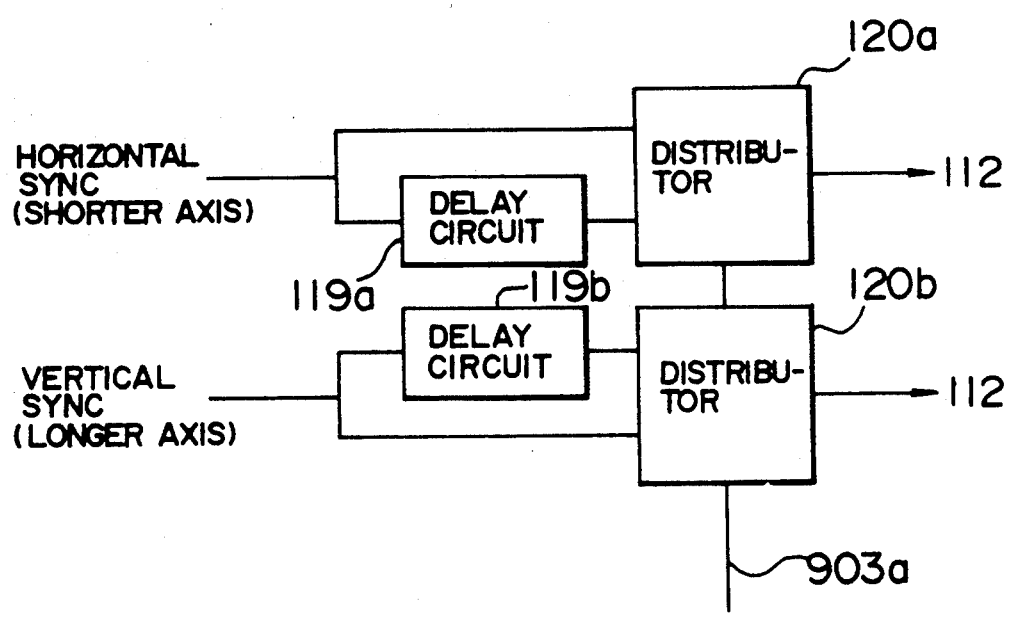
FIG. 9(a)     FIG. 9(b)
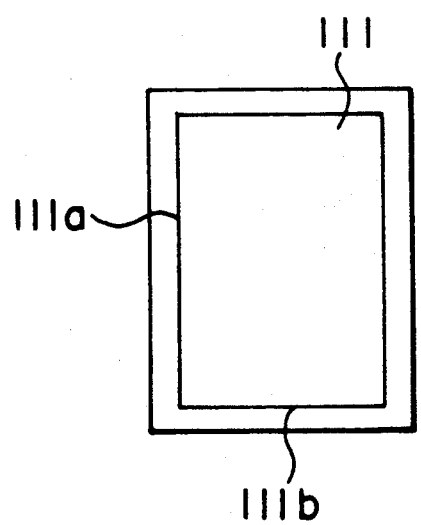   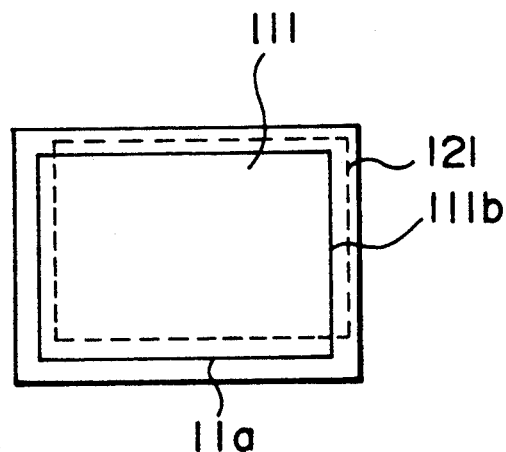

METHOD AND APPARATUS FOR ROTATABLE DISPLAY

BACKGROUND OF THE INVENTION

The present invention relates to a method and apparatus for rotatable display apparatus, and more particularly to a display apparatus including a rectangular screen having short and long sides capable of being rotated between a position in which the short side lies horizontally and a position in which the long side lies horizontally, and suitable for displaying images having different width/height ratio.

A so-called filing system has been practically used in order to meet the requirements of rationalizing office works. With a filing system, a great amount of image data for images, documents and the like are read with an image scanner or the like and stored in a storage device such as an optical disk or magnetic disk so that the image data can be processed, retrieved, renewed, printed out and so on at any time as desired.

As the image data to be stored in a storage device of such a filing system, not only the document data having relatively similar formats, but also the mixed data of such documents with drawings, photographs and the like having relatively various types of formats, e.g., a longer height or width of image frame, are stored in many cases.

If an ordinary display having a fixed ratio of width to height is used for displaying such image data stored in a storage device so as to renew or check the contents thereof, a portion of the image data may be displayed outside of the screen or a blank portion may be a part of the screen image.

U.S. Pat. No. 4,542,377 (corresponding to JP-A-50-123880), discloses display apparatus arranged to be rotatable so that an operator manually rotates, if necessary, the display apparatus by 90 degrees to obtain a ratio of width to height of the screen image suitable for the number of characters per line of the character data to be displayed.

Generally, a display apparatus for use in a filing system adapted to be usable not only for documents but also for images is a large CRT of 17 inches or greater which can display thereon an image of about A-4 size. Therefore, the conventional method of switching the width/height ratio by manually rotating the display apparatus burdens an operator with large power, thereby deteriorating workability.

Furthermore, if it is necessary that the image data of plural pages having different width/height ratios be sequentially displayed to perform some works, the operator is required to visually check the displayed image data whether or not the display screen is to be rotated for that image data. It is practically impossible for the operator to smoothly and immediately respond to a width/height ratio change of the sequentially displayed image data and rotate the display screen.

SUMMARY OF THE INVENTION

A first object of the present invention is to provide a display apparatus capable of changing the width/height ratio of a display screen quickly and readily by driving the display device with driving means.

A second object of the present invention is to provide a rotatable display apparatus having a tilting mechanism for tilting the display screen upward and downward.

A third object of the present invention is to provide a rotatable display apparatus capable of releasing the tilting mechanism while the display device is rotated.

A fourth object of the present invention is to provide a rotatable display apparatus capable of compensating for a displacement of the screen image caused upon rotation of the display device.

A fifth object of the present invention is to provide an information filing system capable of storing display formats of display data together with the display formats.

A sixth object of the present invention is to provide an information filing system capable of automatically changing the display mode of the screen image on the display device in accordance with the stored display format of the display data.

The rotatable display apparatus of this invention comprises a display device having a rectangular display screen; driving device for rotating said display device at least within a range allowing two opposite width/height ratios of said display screen; supporting device for rotatably supporting said display device; and posture controlling device for controlling the rotation posture of said display device with the aid of said driving device, whereby said display device is rotated in accordance with a width/height ratio of the image data to be displayed on the display screen, or alternatively said display device is rotated in accordance with an external command inputted from a keyboard or the like.

In a filing system equipped with the rotatable display apparatus, image data as well as the control information such as display formats regarding the width/height ratio of the image data are stored in storage means, so that the width/height ratio of the display screen is automatically changed when the image data are displayed on the display device, in accordance with the control information. Therefore, the width/ height ratio of the display screen is automatically made to follow a change in display format of the image data to be displayed, thereby considerably improving the workability of the filing system.

BRIEF DESCRIPTION OF THE DRAWINGS

FIG. 1 is a block diagram showing an embodiment of a filing system equipped with a rotatable display apparatus according to this invention;

FIG. 8 is a block diagram showing an example of the circuit arrangement realizing the method of compensating position displacement of a screen image on the rotatable display apparatus;

FIGS. 9(a) and 9(b) illustrate an example of position displacement of the screen image caused by earth magnetism or the like;

DESCRIPTION OF THE PREFERRED EMBODIMENTS

Figure 2:
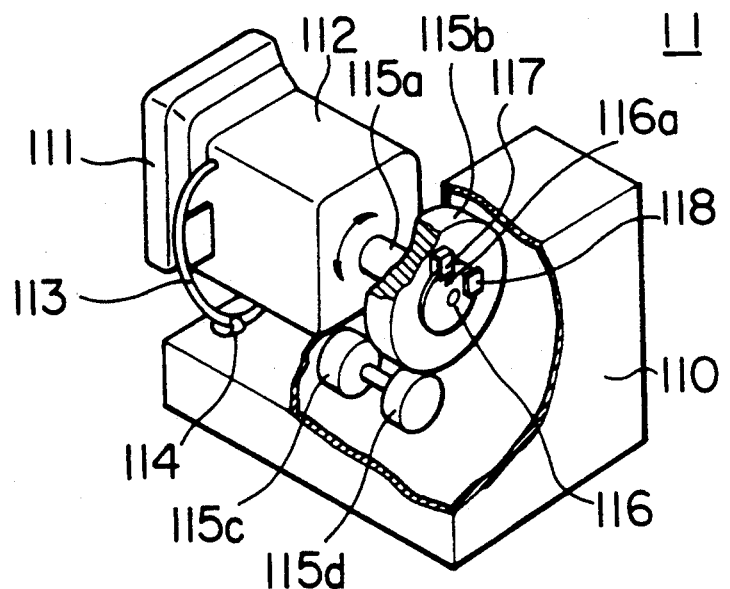
FIG. 2 is a perspective view showing an embodiment of the rotatable display apparatus of this invention.

FIG. 1 is a block diagram showing the internal structure of a filing system according to an embodiment of this invention.

A main control unit 1 including a central processing unit (CPU) controls the input/output of image data and the operation of each device in the filing system. Image data are transferred via a system bus 3. A keyboard 2 is used by an operator to input a command to the main control unit 1 and input character information. An image input unit 4, e.g., an image scanner, reads image information on a medium in the form of binary signals. An image output unit 5, e.g., a laser beam printer, outputs image information stored in the filing system or in an image storage unit of the filing system, to be described later, onto an output medium such as a paper sheet. The image storage unit 6 files or stores image data therein, and is a storage drive such as an optical disk storage drive or magnetic disk storage drive. A main memory 7 stores programs for the main control unit 1 or is used as a work area for image data input/output or correction. An image display control unit 8 controls the display of image data on a display 11, e.g., to determine the display position, magnification and display format of image data. A signal for this control is sent via a character code bus 800 from the main control unit 1. Such a control signal includes the signals for guidance information to be displayed on a specified area of the display 11 for an operator. The display 11 visually displays image data. The display 11 in this embodiment has a rectangular display screen with a different height to width ratio, and is arranged to be capable of taking two positions by means of driving means such as a motor, one position being the shorter side lying horizontally and the other being the longer side lying horizontally. A display rotation control unit 9 controls the position of the display 11, a signal representative of the position being supplied from the main control unit 1 as one of a group of control signals 900.

Figure 3:
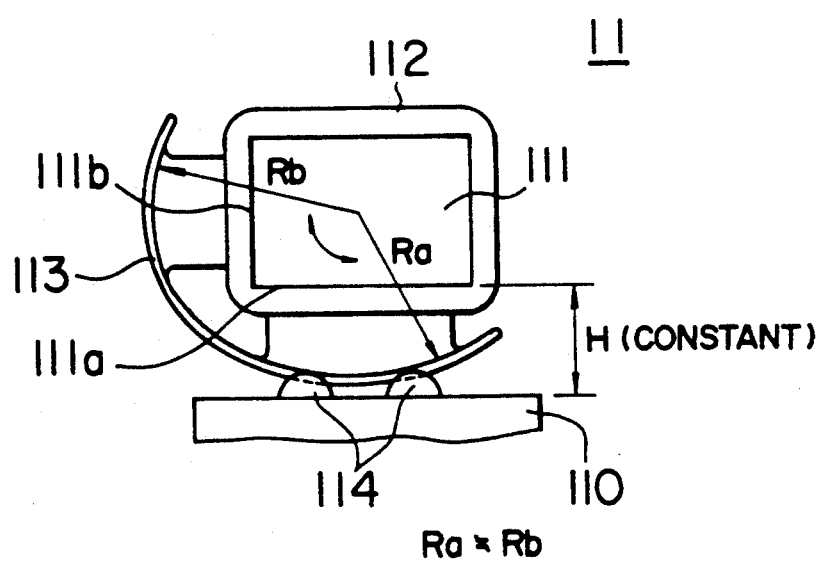
FIG. 3 is a front view of the rotatable display apparatus shown in FIG. 2.

Next, the detailed structure of the display 11 will be described with reference to FIGS. 2 and 3.

The display 11 has a housing 110 and a display device 112 (displaying means) with a rectangular display screen 111 made of a cathode ray tube (CRT). This display device 112 is rotatably supported relative to the housing 110 such that a guide bearing 114 mounted on the housing 110 bears a support ring 113 (supporting means) in slidable relation therewith, and the support ring 113 holds the display device 112 at its center of gravity.

At the back of the display device 112, there are mounted a rotary shaft 115a concentrical to the center of rotation of the display device 112, a wheel 115b fixedly connected to the rotary shaft 115a and a roller 115d in driving contact with the wheel 115 and driven by a motor 115c (driving means). With the rotational force exerted from the motor 115c, the display device 112 is rotated by a desired angle in the desired direction about the center of the display screen 111. If an excessive large external force against the rotation of the display device 112 is applied, the wheel 115b slips relative to the roller 115d to thereby avoid a possible trouble.

A slit disk 116 (rotary position detecting means) having a slit 116a formed at the circumferential outer periphery thereof is coaxially and fixedly connected to the rotary shaft 115a.

The outer periphery of the slit disk 116 is arranged to pass along rotary position detecting switches 117 and 118 (rotary position detecting means) such as photocouplers which are fixedly mounted on the housing 110 at positions radially spaced by 90 degrees relative to the rotary shaft 115a.

The position of the slit 116a which rotates as the rotary shaft 115a rotates is detected by the rotary position detecting switches 117 and 118 which output position detection signals 117a and 118a, so that the rotation state of the display device 112 can be recognized by the display rotation control unit 9.

The support ring 113 supporting the display device 112 is eccentric in form such that the distance Ra from the rotation center of the display screen 111 to the ring on the longer side 111a is different from the distance Rb from the rotation center to the ring on the shorter side 111b. Therefore, the height H from the housing 110 to the bottom of the display screen 111 is the same for both two positions at which the longer side 111a and shorter side 111b each are set at the bottom.

Figure 4:
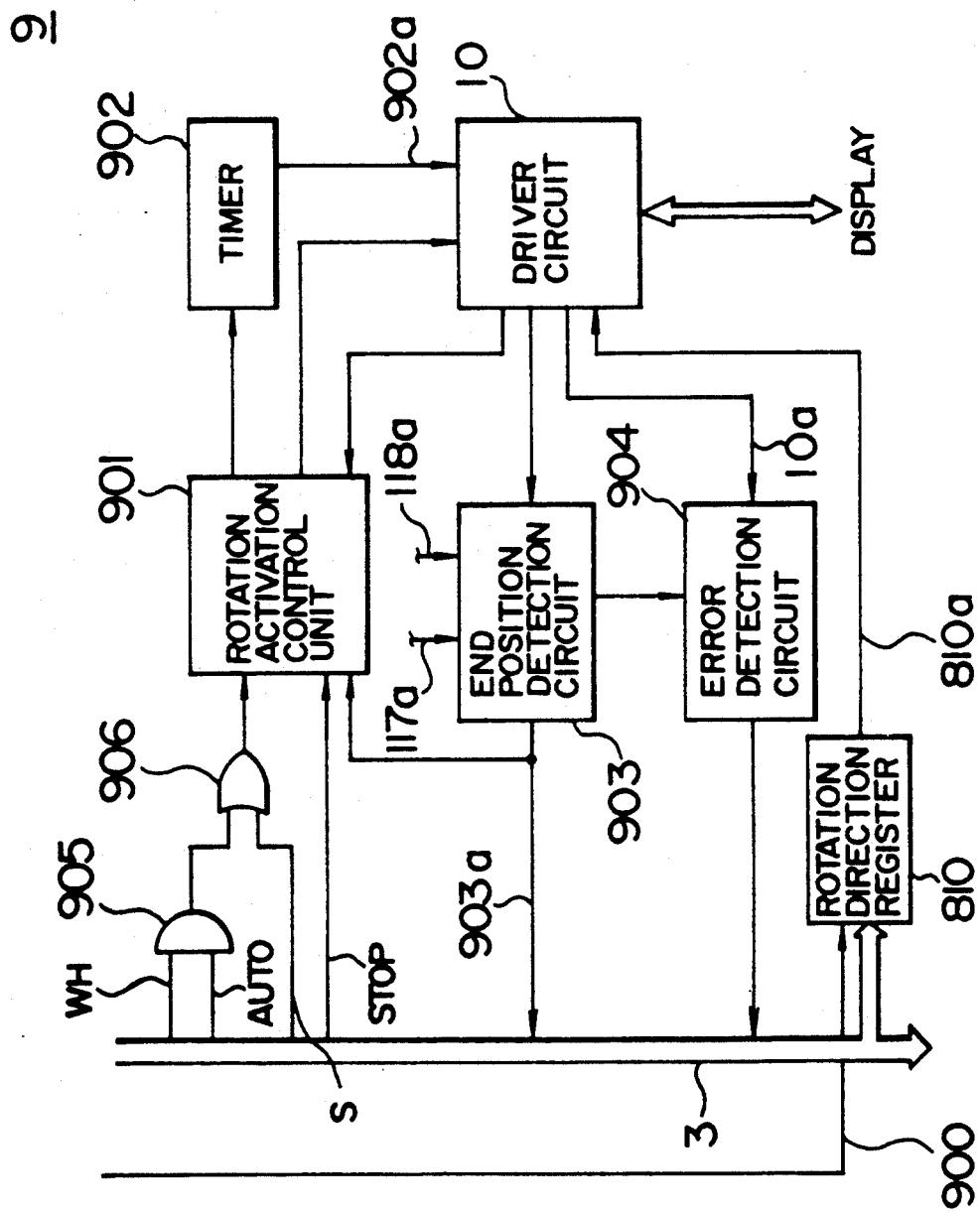
FIG. 4 is a block diagram showing the circuit arrangement of the display rotation control unit shown in FIG. 1.

Next, the circuit arrangement of the display rotation control unit 9 will be described with reference to FIG. 4. The display rotation control unit 9 is constructed of a rotation actuation control unit 901, timer 902, end position detecting circuit 903, error detecting circuit 904 and other circuit elements.

There are connected, between the rotation actuation control unit 901 and the system bus 3, an AND gate 905 and an OR gate 906. The AND gate 905 is inputted with the width/height discrimination information (control information) to be described later and automatic rotation command AUTO, respectively supplied from the main control unit 1 via the system bus 3. The OR gate 906 is inputted with an output from the AND gate 905 and a rotation actuation command S supplied via the system bus 3.

The rotation of the display 11 is effected by means of the rotation actuation control unit 901 and driver circuit 10, if the rotation actuation command S having a level "1" is supplied from the main control unit 1 upon manipulation of the keyboard 2 by an operator, or if the automatic rotation command AUTO and width/height discrimination information WH both having a level "1" are supplied at the same time.

This embodiment therefore is arranged to be capable of selecting one of two modes, i.e., one mode wherein an operator can make the display 11 to rotate upon manipulation of the keyboard 2 at any time the operator desires, and the other mode wherein the display 11 can be rotated automatically in accordance with the width-/height discrimination information WH indicating a longer height or longer width of respective image data fetched from the image storage unit 6.

A forced stop command STOP can also be supplied from the main control unit 3 to the rotation actuation control unit 901 via the system bus 3, thereby allowing a forced rotation stop of the display 11 at a desired time.

The timer 902 connected between the rotation actuation control unit 901 and driver circuit 10 is set with a predetermined limit time which is longer, by a certain time, than a time required for the driver circuit 10 to rotate the display 11 by 90 degrees. If the display 11 does not complete its rotation within the predetermined limit time after the time when the rotation actuation control unit 901 has instructed the driver circuit 10 to rotate the display 11, a time-over command 902a is supplied to the driver circuit 10, main control unit 1 and other necessary circuits to thereby stop the rotation of the display 11.

The end position detection circuit 903 supplies display rotary position information 903 to the main control unit 1, rotation actuation control unit 901, error detection circuit 904 and other necessary circuits, in accordance with the position detection signals 117a and 118a supplied from the rotary position detection switches 117 and 118.

The error detection circuit 904 discriminates error information 10a regarding the state of the motor 115c and the like supplied from the driver circuit 10 and sends the discriminated error information to the main control unit 1.

The driver circuit 10 is also inputted with a rotation direction indication command 810a for the display 11 supplied from the main control unit 1 via a rotation direction register 810. The display 11 is rotated upon receipt of the rotation direction indication command 810a and an actuation command from the rotation actuation control unit 901.

Figure 5:
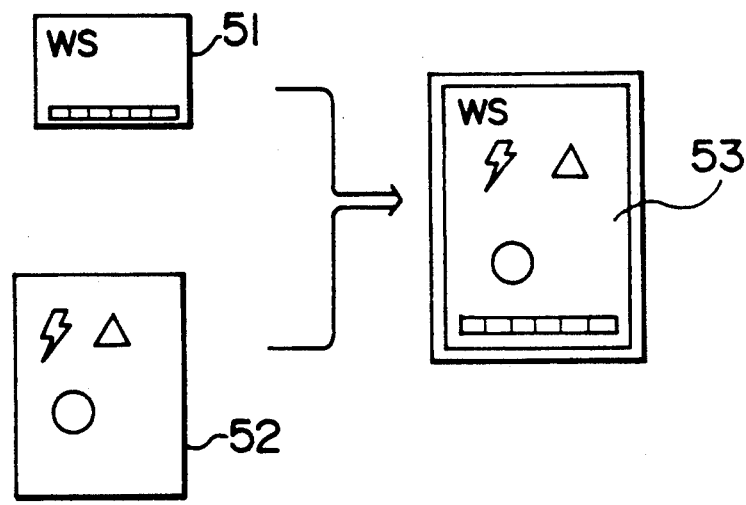
FIG. 5 is a diagram illustrating an image displayed on the rotatable display apparatus.

Next, the operation and internal circuit arrangement of the image display control unit 8 will be described with reference to FIGS. 5 to 7. As shown in FIG. 5, in the filing system of this embodiment, when the image data 52 stored in image storage means are displayed on the display 11, character data 51 are superposed which include guidance information for operator, function key definition, characters representative of mouse mode and the like. The character data 51 are magnified or reduced at a predetermined magnification/reduction factor, and the display position of the character data is determined, to thereby produce a mixed or superposed image 53. This image superposition will further be detailed below.

Figure 6:
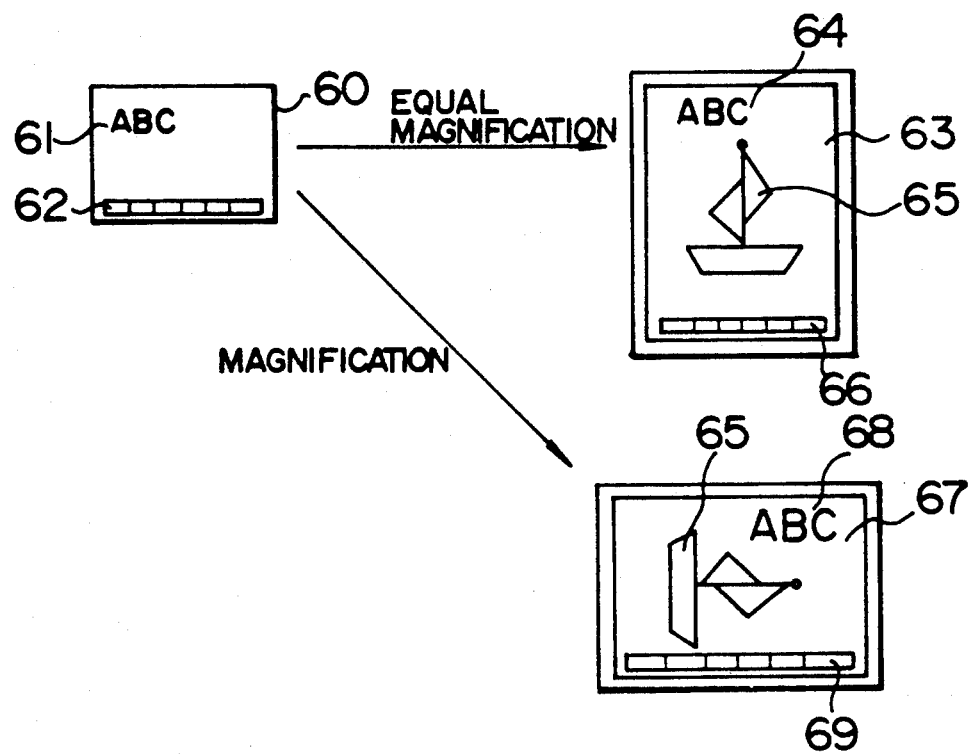
FIG. 6 is a diagram illustrating character codes displayed on the rotatable display apparatus before and after rotation.
Figure 7:
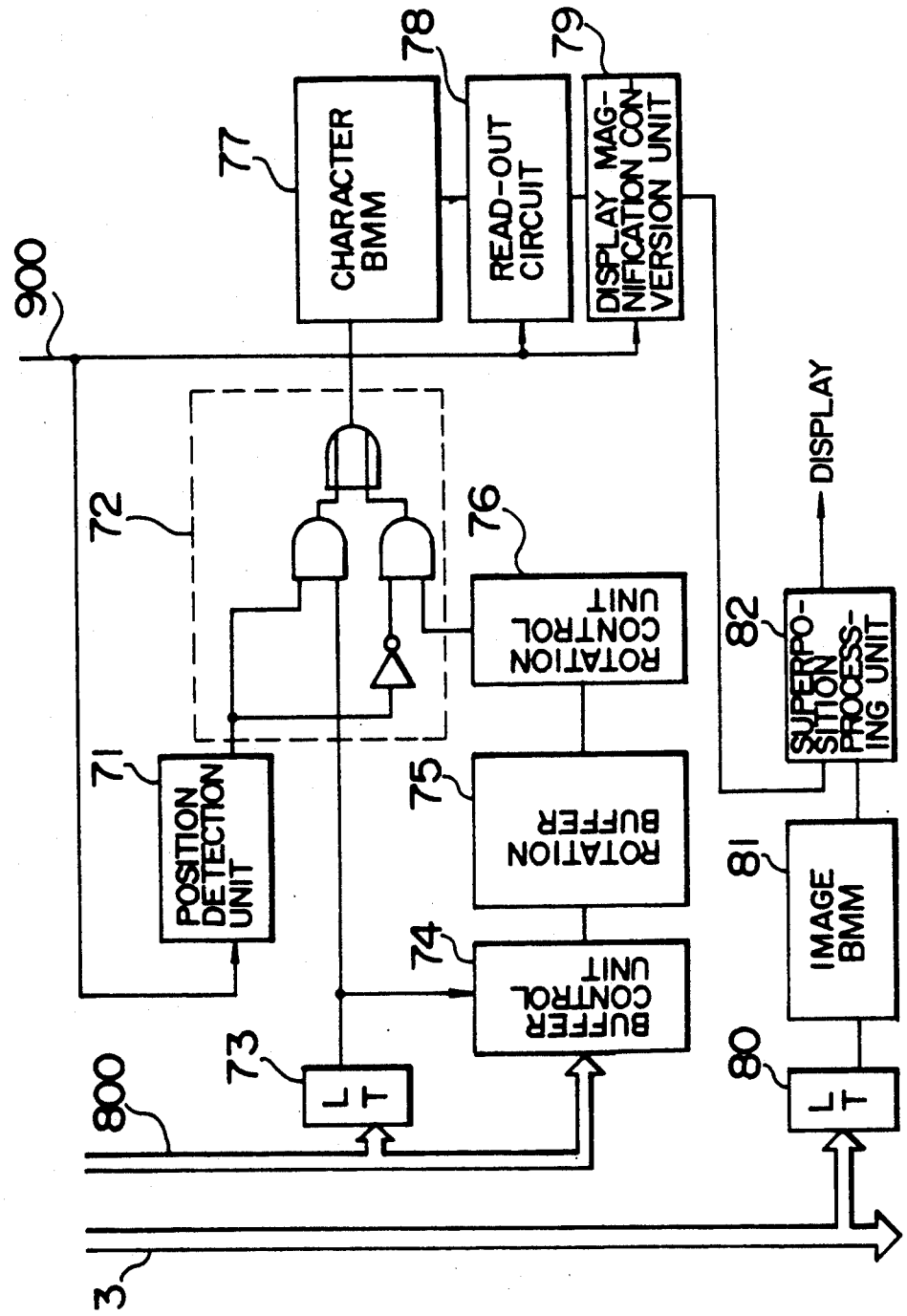
FIG. 7 is a block diagram showing the circuit arrangement of the image display control unit shown in FIG. 1.

FIG. 6 shows diagrams used for explaining the operation of displaying the contents of the character data 60 on a longer height display screen (display area) 63 and a longer width display screen (display area) 67.

In the diagrams of FIG. 6, an image 65 of the image data is displayed on the screen at the same position, while the display 11 is physically rotated by 90 degrees. In contrast, character information 61 of the character data 60 is displayed on the display screen 63 at an equal magnification factor to the character information 64, whereas it is displayed on the display screen 67 at a greater magnification factor after rotated by 90 degrees in the memory, as the character information 68. Similarly, guidance information 62, e.g., for function keys, is displayed on the display screen 63 as the guidance information 66 and on the display screen 67 as the guidance information 69, respectively at different magnification factors and different display positions. The character data are superposed on the image 65 after being converted to a predetermined position and magnification factor, in accordance with a display mode defining the shape and dimension of a display area, the display position and the like.

Next, the image display control unit 8 will be described with reference to the detailed block diagram shown in FIG. 7. The image display control unit 8 includes a character bit map memory (BMM) 77 for storing character codes such as the guidance information 62 sent via the character code bus 800, and an image bit map memory (BMM) 81 for storing image data sent via the system bus 3.

A character code sent via the character code bus 800 is temporarily stored in a latch (LT) 73 and thereafter sent to a buffer control unit 74. The buffer control unit 74 controls the data input/output of a rotation buffer 75 which temporarily stores character codes such as guidance information 62 for the purpose of rotating the character codes. A rotation control unit 76 outputs the data stored in the rotation buffer 75 through conversion of the memory storage addresses so as to display the data on the display by rotating the character codes by 90 degrees.

A position detection unit 71 selects, in accordance with a signal of the control signal group 900 supplied from the main control unit 1 and representative of the display position, either a character code stored in the latch 73 or a character code rotated by 90 degrees and outputted from the rotation control unit 76, and stores the selected one in the character bit map memory (BMM) 77. A read-out circuit 78 reads at a predetermined timing, in accordance with a signal in the control signal group 900 supplied from the main control unit 1, character data from the character bit map memory (BMM) 77, to thereby determine the display position for the character code on the display. A display magnification factor conversion unit 79 converts the read-out character data at a predetermined magnification factor and outputs the converted character data.

The image data sent from the system bus 3 are temporarily stored in a latch (LT) 80 and thereafter, stored in the image bit map memory (BMM) 81.

A mixing processing unit 82 mixes (superposes) an output from the character bit map memory (BMM) 77 with (upon) an output from the image bit map memory (BMM) 81, and outputs the result to the display 11.

The inventors of this invention found that a new problem was associated with the embodiment constructed as above, wherein a cathode ray tube was used as the display device 112 of the display 11, and the width/height ratio of the display screen 111 was changed by physically rotating the display device by 90 degrees. Specifically, upon rotation of the display 11, positional displacement of an image on the display screen 111 occured because of the adverse effects of earth magnetism and magnetic fields generated from other peripheral apparatus. This positional displacement will be described with reference to FIGS. 8, 9(a) and 9(b).

An image on the display screen 111 may sometimes be displaced to, e.g., an upper right area 121 when the display screen 111 is rotated counterclockwise by 90 degrees from the position shown in FIG. 9(a) where the longer side 111a is set upright (upright type) to the position shown in FIG. 9(b) where the longer side 111a is set horizontal (lateral type).

To solve this problem, in this embodiment, the display 11 is provided with delay circuits 119a and 119b at the signal paths of horizontal and vertical sync signals inputted to the display device 112, the delay time of delay circuits 119a and 119b being controllable externally. Distributors 120a and 120b selectively output either a delayed or not-delayed signal of each of the horizontal and vertical sync signals, in accordance with the rotary position information 903a of the display 11. If the image on the display screen 111 displaces to the upper right area as shown in FIG. 9(b), the positional displacement is compensated by advancing the display start position in the horizontal direction (corresponding to the longer side) and by lagging in the vertical direction (corresponding to the shorter side). Since the quantity of earth magnetism can be regarded substantially the same in most cases irrespective of its regional difference, a displacement offset value obtained when the display 11 is rotated by 90 degrees at the factory before delivery is set as such compensation quantity. If the compensation quantity differs from premises to premises where the display is installed due to differing power distribution facilities of the premises as well as due to differing apparatuses disposed around the display, the compensation quantity to be set may be actually measured.

Figure 10:
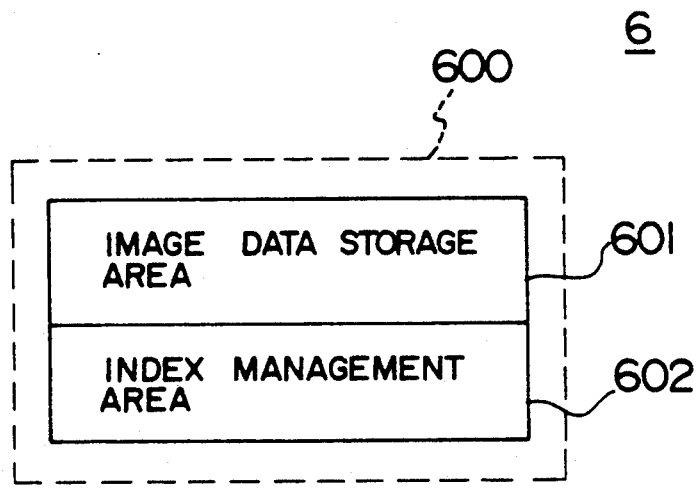
FIG. 10 is a diagram illustrating an example of the memory map of image data in the image data storage unit.

Next, referring to FIGS. 10 and 11, where will be described an example of a memory format of the image data 52 stored in the image data storage unit 6 of the electronic filing system of this embodiment.

A storage medium 600 such as an optical disk, magnetic disk or the like constituting the image data storage unit 6 includes an image data storage area 601 and an index management area 602. The image data storage area 601 stores the ordinary image data 52, whereas the index management area 602 stores the storage position, title and the like of the respective image data 52 in the image data storage area 601.

Figure 11:
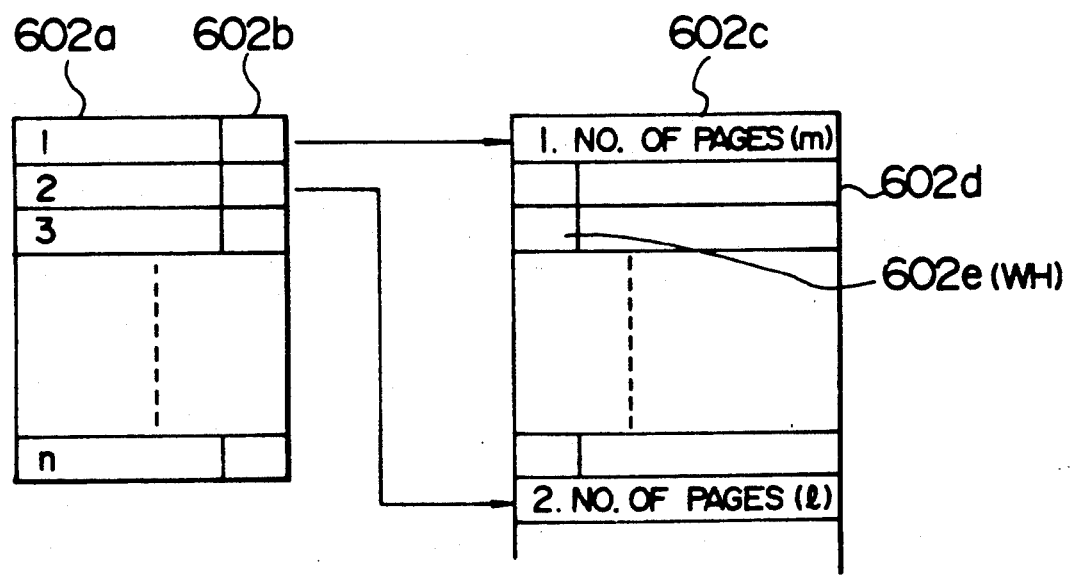
FIG. 11 is a diagram illustrating an example of the memory map of image data in the image data storage unit.

The index management area 602 includes, as shown in FIG. 11, a title storage area 602a and a page pointer 602b, the title storage area 602a storing a title of a document made of a plurality of image data. The page pointer 602b stores the information representing a page number record area 602c in which the number of pages of a set of image data 52 given by a title is recorded. At the area following the page number record area 602c, an image pointer 602d is recorded which indicates the storage position, in the image data storage area 601, of a set of image data of the associated document given by the title. A width/height information flag area 602e is provided in correspondence with each image pointer 602d. The width/height information flag area 602e stores the width/height discrimination information WH for discriminating whether the image data 52 indicated by the image pointer 602d is of an upright type or lateral type. The width/height discrimination information WH for discrimination between the upright type and lateral type is recorded beforehand when image data are registered. For instance, the image data for the upright type is given "1" and the image data for the lateral type is given "0" as the width/height discrimination information WH.

Figure 12:
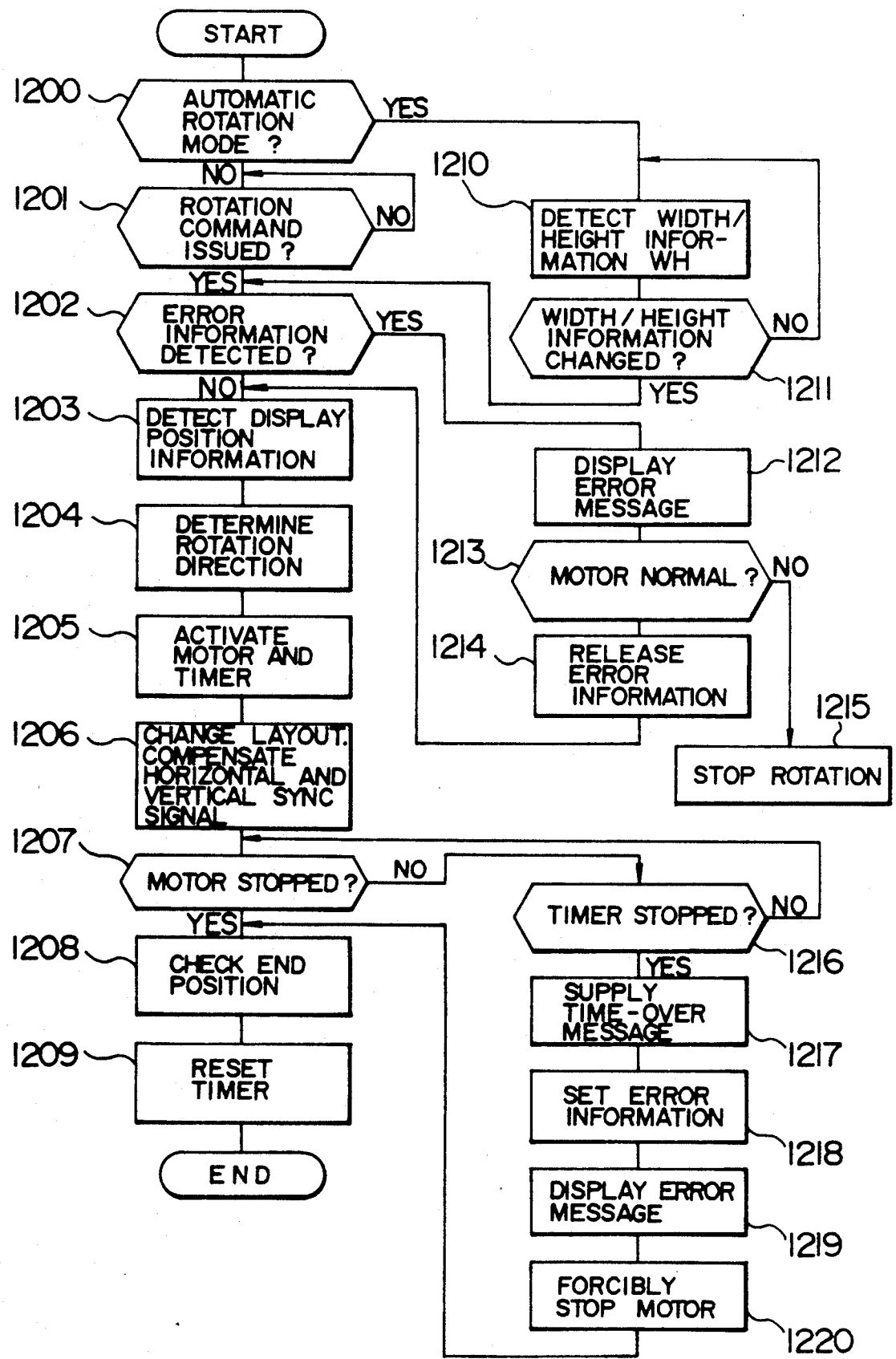
FIG. 12 is a flow chart illustrating the operation of the filing system equipped with the rotatable display apparatus according to an embodiment of this invention.

Next, the operation of the filing system equipped with the rotatable display apparatus of this embodiment will be described with reference to the flow chart shown in FIG. 12.

Upon turning on the power, the main control unit 1 detects the present posture of the display device 112 based on the position detection signals 117a and 118a obtained by the end position detection circuit 903 and the rotary position detection switches 117 and 118 of the display control unit 9. If it is judged that the display device 112 is at an intermediate position between the upright and lateral positions, data for a predetermined rotation direction are forcibly set at the rotation direction register 810 and thereafter, a set of operations at step 1202 and following steps to be described later are executed to automatically set the display device at the upright posture or lateral posture.

Under this condition, the description will be first directed to the case where at step 1200 a mode is selected, in which mode an operator judges if the display device 112 of the display 11 is to be rotated or not and causes the width/height ratio of the display screen 111 to match the image data to be displayed.

First, it is checked if the operator has instructed to rotate the display device 112 by means of the keyboard 2 or a predetermined switch (not shown) (step 1201). If a rotation command is detected, the main control unit 1 supplies the actuation command S to the display rotation control unit 9.

Upon receipt of this actuation command S, the rotation actuation control unit 901 of the display rotation control unit 9 makes the motor 115c operable with the aid of the driver circuit 10.

At the same time, the error detection circuit 904 checks to see if the error information 10a is being generated from the driver circuit 10 (step 1202). If the error information 10a is being generated, an error message is displayed on the display device 11 step 1212), and an abnormal state of the driving system such as the motor 115c is checked (step 1213). If there is an abnormal state, the rotation operation is not executed (step 1215).

On the other hand, if the error information 10a is not generated at step 1213, or if the error information 10a is being generated and there is no abnormal state of the motor 115c and the like, the error information 10a is released (step 1214). Then, the present position information of the display device 112 is detected based on the display rotary position information 903a sent from the end position detection circuit, in accordance with the position detection signals 117a and 118a supplied from the rotary position detection switches 117 and 118 (step 1203).

Upon receipt of the display rotary position information 903a, the main control unit 1 refers to the previous rotation direction stored in the rotation direction register 810 in the image display control unit 8, and based on both the information, determines the rotation direction and updates the contents of the rotation direction register 810 so as to set the determined rotation direction and thereafter supply the rotation direction indication command 810a to the driver circuit 10 (step 1204).

Upon receipt of the rotation direction indication command 810a, the driver circuit 10 starts rotating the motor 115c, and at the same time the rotation actuation control unit 901 causes the timer 902 to start operating (step 1205).

Simultaneously with the start of the rotation operation of the display device 112 in the predetermined direction by means of the motor 115c, the image display control unit 8 performs a set of rotation operations described above to automatically change the image layout, by transferring the guidance information 62 constituting the character information and the like from the latch (LT) 73 or the rotation control unit 76 to the character bit map memory 77. For instance, the guidance information 62 is rotated in the predetermined direction by 90 degrees so that the guidance information displayed at the lower portion of the display screen 60 shown in FIG. 6 is changed to the image displayed on the display screen 67 after the rotation thereof by 90 degrees.

At the same time, the distributors 120a and 120b optimize the delay conditions of the horizontal and vertical sync signals to be inputted to the display device 112, in accordance with the display rotary position information 903a, to thereby compensate the positional displacement due to the earth magnetism against the display screen (step 1206).

The driver circuit 10 monitors the motor 115c (step 1207) and the timer 902 while the motor 115c rotates (step 1216). If a time-over command 902a is detected, it is assumed that the rotation operation of the display device 112 by means of the motor 115c has not been completed within a predetermined time limit because of certain reasons such as an external force. Then, a time-over message is generated (step 1217), the error information 10a is set (step 1218), an error message is displayed as system information G1 (step 1219) and the motor 115c is forcibly stopped (step 1220).

On the other hand, if the motor 115c stops normally prior to generating the time-over command 902a from the timer 902 at step 1207, it is confirmed if the objective posture of the display device 112 has been obtained by detecting the display rotary position information 903a supplied from the end position detection circuit 903 based on the position detection signal 117a or 118a supplied from the position detection switch 117 or 118 (step 1208). Thereafter, the timer 902 is reset (step 1209). A set of consecutive operations initiated by the operator intention has thus been completed for changing the width/height ratio of the display screen 111 by rotating the display device 112 by 90 degrees.

Since the support ring is eccentric relative to the rotation center of the display device 112, the height H from the housing 110 to the displayed guidance information 62 does not change before and after the rotation of the display device 112. The position of the guidance information 62 displayed on the display screen 111 is thus unchanged, before and after the layout change, relative to an operator taking a predetermined posture relative to the housing 110.

Next, the description will be directed to the case where it is considered at step 1200 that the operator has selected an automatic rotation mode.

Upon selection by the operator the automatic rotation mode through manipulation of the keyboard 2 or a predetermined switch (not shown), the main control unit 1 supplies to the display rotation control unit 9 the automatic rotation command AUTO which is latched as a signal of "1" level to the one input terminal of the AND gate 905.

Under this condition, if the operation instructs that optional image data 52 is to be read from the image storage unit 6 and displayed on the display 11, detected are the image data 52 and width/height discrimination information WH previously stored therewith are detected (step 1210).

If the width/height discrimination information WH is the same as previously used, i.e., if it is not necessary to change the width/height ratio of the display screen 111, the main control unit 1 sets the width/height discrimination information WH at "0" level to thereby maintain the display device 112 stationary by proceeding directly to step 1202, bypassing the rotation command issue. If the width/height discrimination information WH is different from the previously used one, the width/height discrimination information WH of "1" level is supplied to the display rotation control unit 11 to accordingly make the AND gate 901 output a signal of "1" level and start the operation at step 1202 and following steps by the rotation actuation control unit 901 and the like as described previously (step 1211).

As described above, in displaying a document with plural pages on the display 11, the width/height ratio of the display screen 111 is automatically changed to an optimum one for the particular image data 52 by selectively rotating the display device 112. In addition, the layout of and the display position as viewed from the operator of the guidance information 62 such as error messages, help messages or the like, are maintained always constant irrespective of the rotation of the display screen 111.

As appreciated from the foregoing description of the embodiment, the width/height ratio of the display screen 111 is changed while rotating the display screen 112, in accordance with the operator intention, or automatically in accordance with a change of the width/height ratio of the image data 52 to be displayed. Therefore, even if a large sized and heavy cathode ray tube is used as the display device 112, a heavy burden is not charged with the operator to thus considerably improve the workability of the apparatus when compared to a conventional manual operation.

In addition, the layout of and the display position as viewed from the operator of the guidance information 62 such as error messages, help messages or the like, are maintained always constant irrespective of the rotation of the display screen 111, resulting in an easy and comfortable operation.

Furthermore, if an excessively large external force is applied against the rotation of the display device 112, the rubber roller 115d driven by the motor 115c slips relative to the wheel 115b fixedly mounted on the display device 112. An excessive load is not therefore applied to the display device 112 and motor 115c, allowing safe execution.

Figure 14:
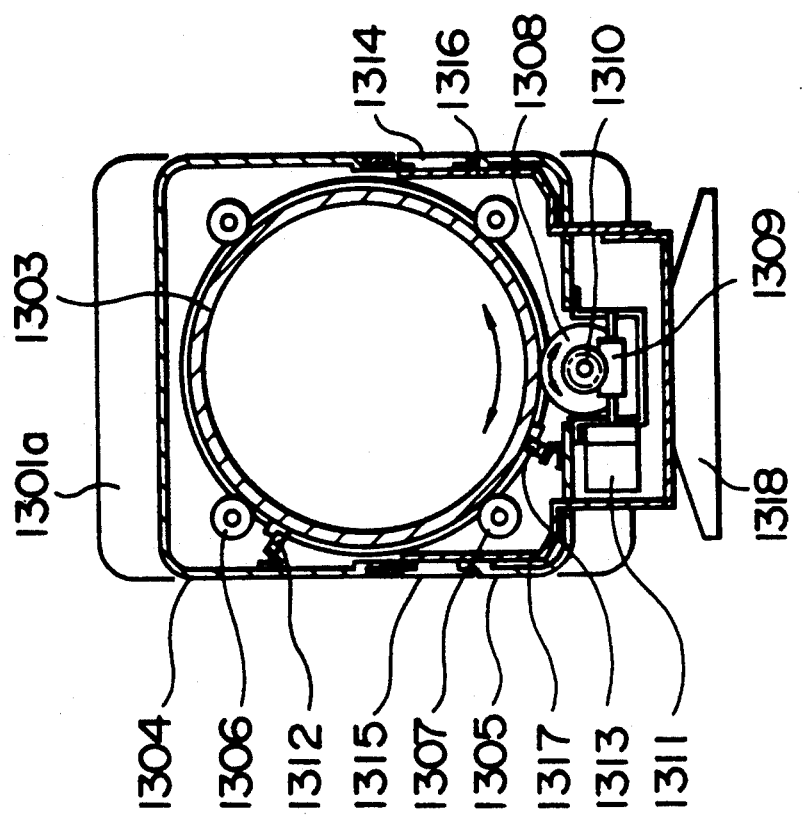
FIG. 14 is a sectional view taken along line A—A in FIG. 13 of the rotatable display apparatus.
Figure 13:
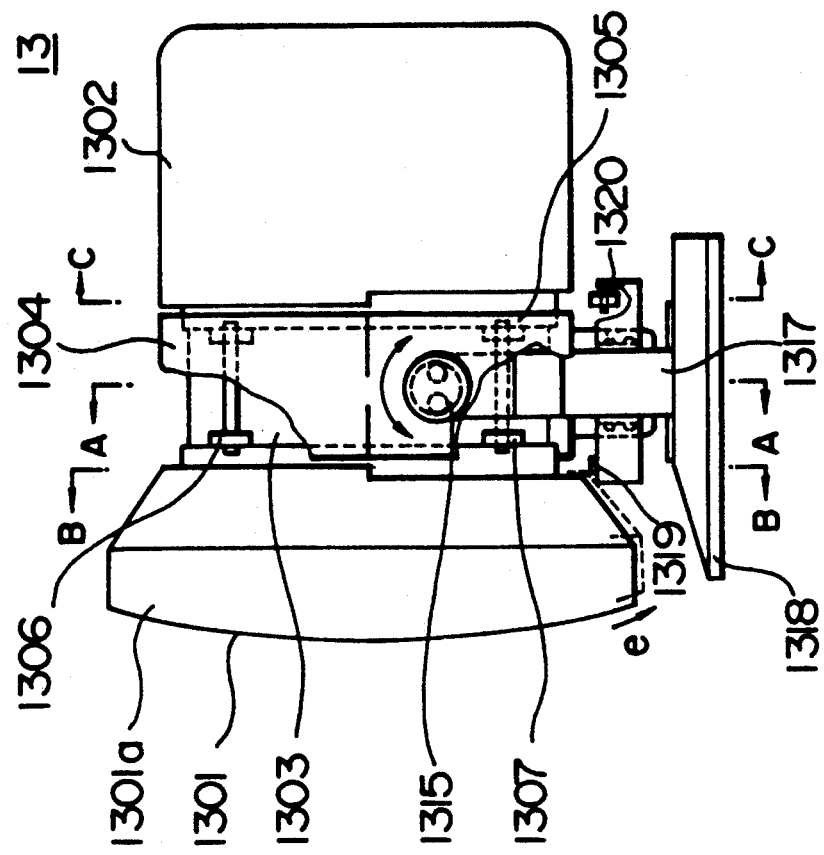
FIG. 13 is a side view of the rotatable display apparatus according to another embodiment of this invention.
Figure 15:
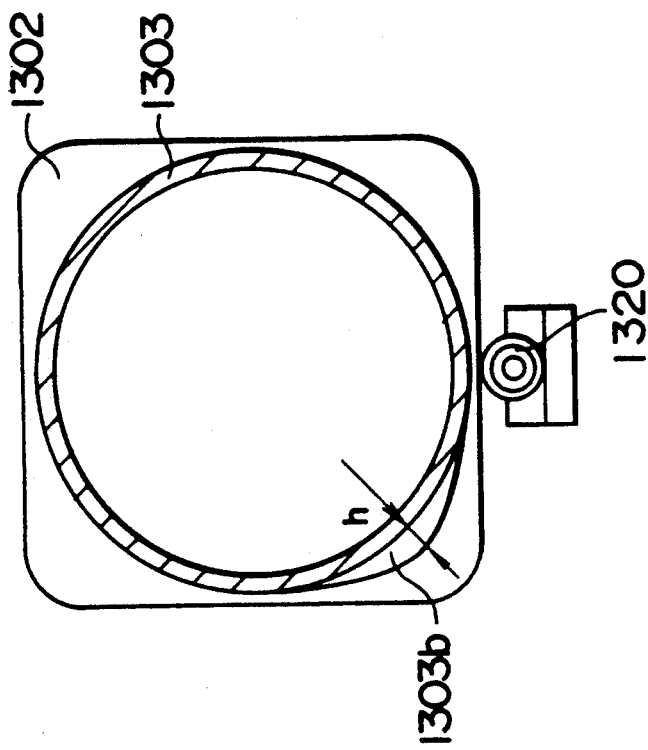
FIG. 15 is a sectional view taken along line B—B in FIG. 13 of the rotatable display apparatus.
Figure 16:
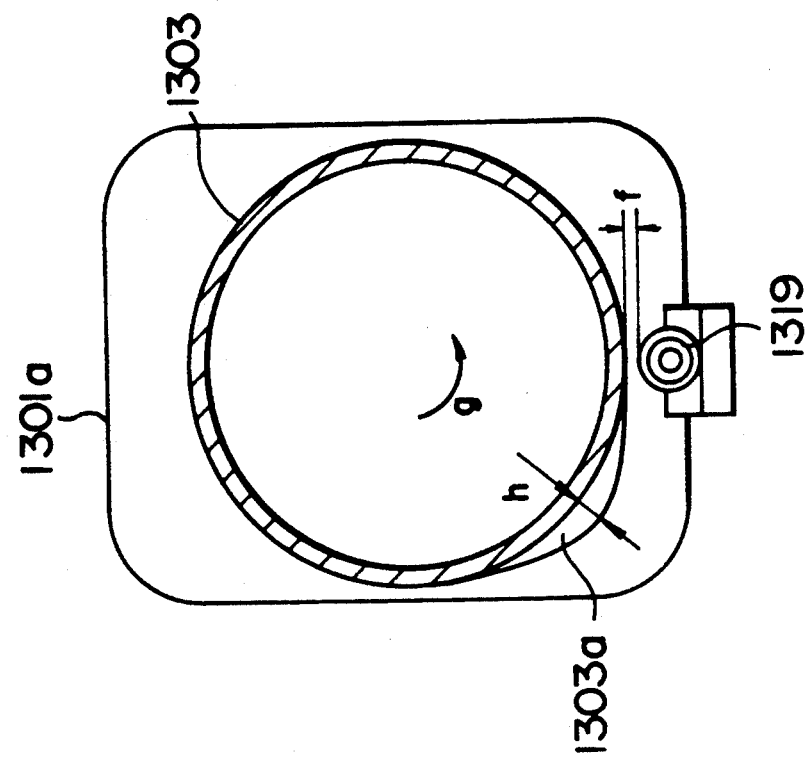
FIG. 16 is a sectional view taken along line C—C in FIG. 13 of the rotatable display apparatus.

FIG. 13 is a side view partially in cross section of another embodiment of the display 13 according to the present invention. FIGS. 14, 15 and 16 are sectional views taken along lines A—A, B—B and C—C, respectively.

A rotary ring 1303 is mounted along the plane of the center of gravity of a display device 1302 made of a cathode ray tube and the like and having a rectangular display screen 1301.

The rotary ring 1303 is rotatably supported by a plurality of guide rollers 1306 and 1307 disposed within upper and lower ring cases 1304 and 1305 so as to be rotatable in the plane parallel with the display screen 1301.

A rubber roller 1308 in friction driving contact with the rotary ring 1303 and a motor 1311 for applying a rotation force to the rubber roller 1308 via a worm gear 1309 and worm wheel 1310, are supported on the lower ring case 1305. While the motor 1311 rotates in a certain direction, the display device 1302 rotates in a corresponding certain direction about the center of gravity of the display device within the plane parallel with the display screen 1301.

A plurality of rotary position detection switches 1312 and 1313 are fixedly connected within the upper and lower ring cases 1304 and 1305, the switches being spaced apart relative to one another by 90 degrees in the radial direction of the rotary ring 1303. The switches are actuated by a projection (not shown) formed on the rotary ring 1303 so that the rotation posture of the display device 1302 can be detected.

The upper and lower ring cases 1304 and 1305 are supported on a tilt base 1318 via tilt shafts 1314 and 1315 and support arms 1316 and 1317. The display device 1302 supported by the upper and lower rings 1304 and 1305 can be tilted up and down within a predetermined tilt range through manual operation by an operator.

As best shown in FIGS. 15 and 16, formed on the peripheral portion of the rotary ring 1303 are cam portions 1303a and 1303b gradually projecting from the rotary ring at the positions corresponding to the corner of the display screen 1301 between the tilt shafts 1314 and 1315. Posture control rollers 1319 and 1320 are mounted on the support arms 1316 and 1317.

Referring back to FIG. 13, it is assumed that the bottom of the display screen 13 takes the position indicated by a broken line by tilting down the display screen 1301 in the direction indicated by an arrow e. In this case, as shown in FIG. 15, the clearance f between the rotary ring 1303 and posture control roller 1319 becomes small. If the screen display 1301 is further rotated in the direction indicated by an arrow g, the cam portion 1303a abuts on the posture control roller 1319 so that the display screen 1301a is tilted up to the original position. Similarly if the display device is rotated while tilting up the display screen 1301a, the cam portion 1303b shown in FIG. 16 abuts on the posture control roller 1320 so that the display screen 1301a is tilted down to the original position.

As described above, if the display device 1302 is rotated while tilting up or down, the portion having a larger radius such as the corner of the rectangular display screen 1301a may abut on another member such as the housing.

For this reason, in this embodiment, the cam portion 1303a or 1303b is arranged to come into slide contact with the posture control roller 1319 or 1320 while rotating the display device 1302. Therefore, even if the display device is tilted up or down, the front or back end portion of the display device 1302 is lifted up during the rotation to thereby automatically make the tilt angle zero and avoid a possible trouble as described above.

Further, even if an excessively large external force obstructing the rotation operation of the display device 1302 is applied, the rubber roller 1310 in slide contact with the rotary ring 1303 slips so that damage of the motor 1311 or other components due to over load can be avoided.

As described above, in this embodiment, the width/height ratio of the display screen 1301 can be automatically changed by physically rotating the display device 1302, and the display screen 1301 can be easily tilted by the operator by tilting up or down the display device 1302. Therefore, the workability can be improved further. Furthermore, the posture of the display device 1302 tilted up or down can be automatically corrected while rotating the display device 1302, so that the collision against another member can be avoided reliably, to thus realize a safe and comfortable work environment.

The invention by the present inventors has been described in particular with reference to the preferred embodiments. The invention is not limited to the embodiments only, but obviously various modifications are possible without departing from the scope and spirit of the present invention.

For example, as the display device, not only a cathode ray tube, but also other general image display devices such as a liquid crystal display and a plasma display may be used.

We claim:

1. A display apparatus, comprising:
   a display means having a display screen of a predetermined shape for visually displaying information on said display screen in an environment of a magnetic field;
   means for rotatably supporting said display means;
   rotating means for rotating said display means by a predetermined angle relative to the magnetic field and positioning said display means;
   compensating means for compensating a positional displacement of displayed information caused by the magnetic field when said display means is rotated;
   said rotating means rotating said display means between two rotated positions oriented at 90° with respect to each other;
   means providing a control signal corresponding to the rotated position of said display means;
   said compensating means, in response to the said control signal, providing a fixed delay to at least one of the horizontal and vertical sync signals which are used for synchronization of image formation to be displayed on said display means only when said display means is in one of said rotated positions;
   said rotating means rotates said display means between said rotated positions in response to a mode signal indicating vertical or horizontal display;
   automatic means responsive to the information means for generating said mode signal; and
   means for storing image data together with a mode indicator unique to the image data, and said automatic means generating the mode signal in response to the mode indicator stored with and unique to the image data being displayed on the display screen.

2. A display apparatus according to claim 1, wherein said rotating means includes driving means for driving and rotating said display means.

3. A display apparatus according to claim 1, wherein said compensating means includes detecting means for detecting the rotated position of said display means relative to the magnetic field, and for adjusting the display position of information on said display screen in accordance with the rotated position of said display means.

4. A display apparatus according to claim 1, wherein said compensating means provides the fixed delay for each of the horizontal sync and vertical sync signals in only the one rotated position.

5. The display apparatus according to claim 1, wherein said compensating means further includes means for adjusting the delay for different environment magnetic fields.

6. The display apparatus according to claim 1, wherein said rotating means rotates said display means between said rotated positions in response to a mode signal indicating vertical or horizontal display; and further including user input means for selectively inputting said mode signal.

7. A display apparatus, comprising:
   display means having a rectangular display screen with longer and shorter sides for visually displaying information on said display screen;
   means for supporting said display means at a first position with said longer side being aligned in the vertical direction and at a second position with said longer side being aligned in the horizontal direction;
   a motor;
   means for transmitting a driving force from said motor to said supporting means only up to a maximum overload force equal to a predetermined amount of external force applied to said display means preventing rotation;
   means for issuing a rotation command instructing rotation of said display means;
   control means for controlling activation of said motor in response to the rotation command from said means for issuing to rotate said display means;
   said display means having a center of gravity and an arcuate surface extending for at least 90 degrees substantially concentric with the center of gravity;
   said means for transmitting including a wheel peripherally and frictionally engaging said arcuate surface and being rotatable about an axis parallel to the axis of said arcuate surface, and gearingly interconnecting said motor and said wheel;
   said arcuate surface extending for substantially 360 degrees;
   said means for supporting including said arcuate surface and a plurality of fixed axis rollers rotatable about fixed axes parallel with said axis and rotatably engaging said arcuate surface at points spaced peripherally around said arcuate surface;
   said means for supporting including a stationary base, opposed support arms extending upwardly from said stationary base, and horizontally aligned rotatable bearing members on said support arms; and
   said display means including complimentary rotatable bearing members operatively engaging with said bearing members of said support arms for supporting said display means for tilting relative to said stationary base about a horizontal tilt axis.

8. A display apparatus according to claim 7, wherein said means for transmitting is a rotatable friction slip coupling having an overload slippage force equal to the maximum overload force.

9. A display apparatus according to claim 7, including timer means for monitoring the rotation command and issuing a time over command when the rotation command has been issued for longer than a fixed period of time; and said control means deactivating said motor in response to said time over command notwithstanding the issuing the rotation command.

10. A display apparatus according to claim 9, further including means issuing a position signal indicating when said display means is at said first position and indicating when said display means is at said second position; and said timer means resetting in response to said position signals only indicating that said display means is at said first position or at said second position.

11. A display apparatus according to claim 7, wherein said display means further includes a cam eccentric with respect to said arcuate surface and rotatable with said display means; and follower means mounted on said base to engage said cam when said display means rotates between said first and second positions for driving said display means about the tilt axis in one direction towards a neutral tilt position.

12. A display apparatus according to claim 11, wherein said display means further includes another cam eccentric with respect to said arcuate surface and rotatable with said display means; and another follower means mounted on said base to engage said another cam when said display means rotates between said first and second positions for driving said display means about the tilt axis in a second direction opposite to said one direction towards the neutral tilt position.

13. A display apparatus, comprising:
   display means having a rectangular display screen with longer and shorter sides for visually displaying information on said display screen;
   means for supporting said display means at a first position with said longer side being aligned in the vertical direction and at a second position with said longer side being aligned in the horizontal direction;
   wherein said means for supporting includes a stationary base, opposed support arms extending from said stationary base, and horizontally aligned rotatable bearing members on said support arms; said display means including complimentary rotatable bearing members operatively engaging with said bearing members of said support arms for supporting said display means for tilting relative to said stationary base about a horizontal tilt axis;
   a cam eccentric with respect to said arcuate surface and rotatable with said display means; and
   follower means mounted on said base to engage said cam when said display means rotates between said first and second positions for driving said display means about the tilt axis in one direction towards a neutral tilt position.

14. A display apparatus according to claim 13, wherein said display means further includes another cam eccentric with respect to said arcuate surface and rotatable with said display means; and
   another follower means mounted on said base to engage said another cam when said display means rotates between said first and second positions for driving said display means about the tilt axis in a second direction opposite to said one direction towards the neutral tilt position.

15. A display apparatus according to claim 13, wherein said means for supporting fixes a distance H between a fixed horizontal reference and the lower of said sides to be equal in both the first position and the second position.

16. An information filing system, comprising:
   display means having a rectangular display screen with longer and shorter sides for visually displaying information on said display screen;
   means for supporting said display means at a first position with said longer side being aligned in the vertical direction or at a second position with said longer side being aligned in the horizontal direction, and mounting said display means for rotation between said first and second position;
   means for inputting image information for creating a specific image on the display screen;
   means for storing the image information input by said input means and a position flag unique to the specific image indicating a selected one of the first and second positions;

means for reading the image information and position flag from said means for storing;

means responsive to the information of the read position flag for automatically rotating said display means to one of said first and second positions as determined by the position flag unique to the specific image;

means for selecting the orientation of the read image information displayed on said display screen between first and second orientations rotated 90 degrees with respect to each other in accordance with the position flag unique to the specific image indicating one of said first and second positions;

control means for generating a character code including guidance information for an operator;

means for effectively rotating the character code 90 degrees with respect to said display screen in accordance with the position flag unique to the specific image; and means for superimposing the character code with the image information on said display screen.

17. An information filing system according to claim 16, wherein said display control means includes display magnification conversion means for converting a display magnification of the character code, converts the magnification of the character code in accordance with the display mode, and mixes the character code with the image information.

18. An information filing system according to claim 16, wherein said display control means includes display position determining means for determining the display position of the character code in accordance with the position flag, and mixes the character code with the image information.

19. An information filing system according to claim 16, further including means for magnifying only that portion of the character code that has guidance information for the operator to increase its horizontal extent in proportion to the increase in screen width when the display means is rotated from said first position to said second position.

20. A display apparatus according to claim 19, wherein that portion of the character code providing the guidance information displays as a function bar extending horizontally on the display screen for substantially the full width of the display screen in each of said first and second positions.

* * * * *